(12) United States Patent
Ashton et al.

(10) Patent No.: US 7,222,401 B2
(45) Date of Patent: May 29, 2007

(54) METHOD FOR MAKING A HEAD RESTRAINT ASSEMBLY

(75) Inventors: Ronald Ashton, Warwickshire (GB); Sandra Jean Hemmings, Warwickshire (GB); Bailey Ridgway, Warwickshire (GB)

(73) Assignee: Eagle Ottawa, LLC, Rochester Hills, MI (US)

( * ) Notice: Subject to any disclaimer, the term of this patent is extended or adjusted under 35 U.S.C. 154(b) by 330 days.

(21) Appl. No.: 11/026,106

(22) Filed: Dec. 30, 2004

(65) Prior Publication Data

US 2005/0140198 A1 Jun. 30, 2005

Related U.S. Application Data

(62) Division of application No. 10/225,614, filed on Aug. 22, 2002, now Pat. No. 6,857,699.

(51) Int. Cl.
*A47C 7/38* (2006.01)
*B68G 7/00* (2006.01)

(52) U.S. Cl. ............................. 29/91; 29/91.1; 29/91.5; 29/448; 29/469; 29/281.1; 297/220; 297/391

(58) Field of Classification Search .................... 29/91, 29/91.1, 91.5, 448, 469, 525.01, 559, 281.1; 269/21; 297/220, 391, 452.59, 440.11
See application file for complete search history.

(56) References Cited

U.S. PATENT DOCUMENTS

| 5,379,708 | A | 1/1995 | Moll et al. |
|---|---|---|---|
| 5,405,190 | A | 4/1995 | Jeffcoat et al. |
| 5,700,057 | A | 12/1997 | De Filippo |
| 5,896,823 | A | 4/1999 | Ishikawa et al. |
| 5,906,414 | A | 5/1999 | Rus |
| 6,000,759 | A | 12/1999 | Pedronno et al. |
| 6,079,776 | A | 6/2000 | Breitner et al. |
| 6,164,226 | A | 12/2000 | Takei |
| 6,183,045 | B1 | 2/2001 | Marfilius et al. |

FOREIGN PATENT DOCUMENTS

| EP | 0 341 683 B1 | 11/1989 |
|---|---|---|
| FR | 2 236 345 | 1/1975 |
| FR | 2 308 586 | 11/1976 |
| JP | 11-263158 A | 9/1989 |
| JP | 11-263158 A | 9/1999 |
| JP | 11-321416 A | 11/1999 |
| JP | 2002-347043 A | 12/2002 |

*Primary Examiner*—Jermie E. Cozart
(74) *Attorney, Agent, or Firm*—Foley & Lardner LLP

(57) ABSTRACT

A head restraint assembly comprising a frame assembly including a retention member. A pillow coupled to the frame assembly with the pillow configured to allow access to the retention member. A cover assembly having a back end and a front end envelopes and conforms to the shape of the pillow with the cover assembly including a flat strip member coupled to the back end and a barb strip member coupled to the front end of the cover assembly. The flat strip member and the barb strip member couple with each other in the retention member closing the cover assembly over the pillow. Also, a method for making a head restraint assembly.

7 Claims, 7 Drawing Sheets

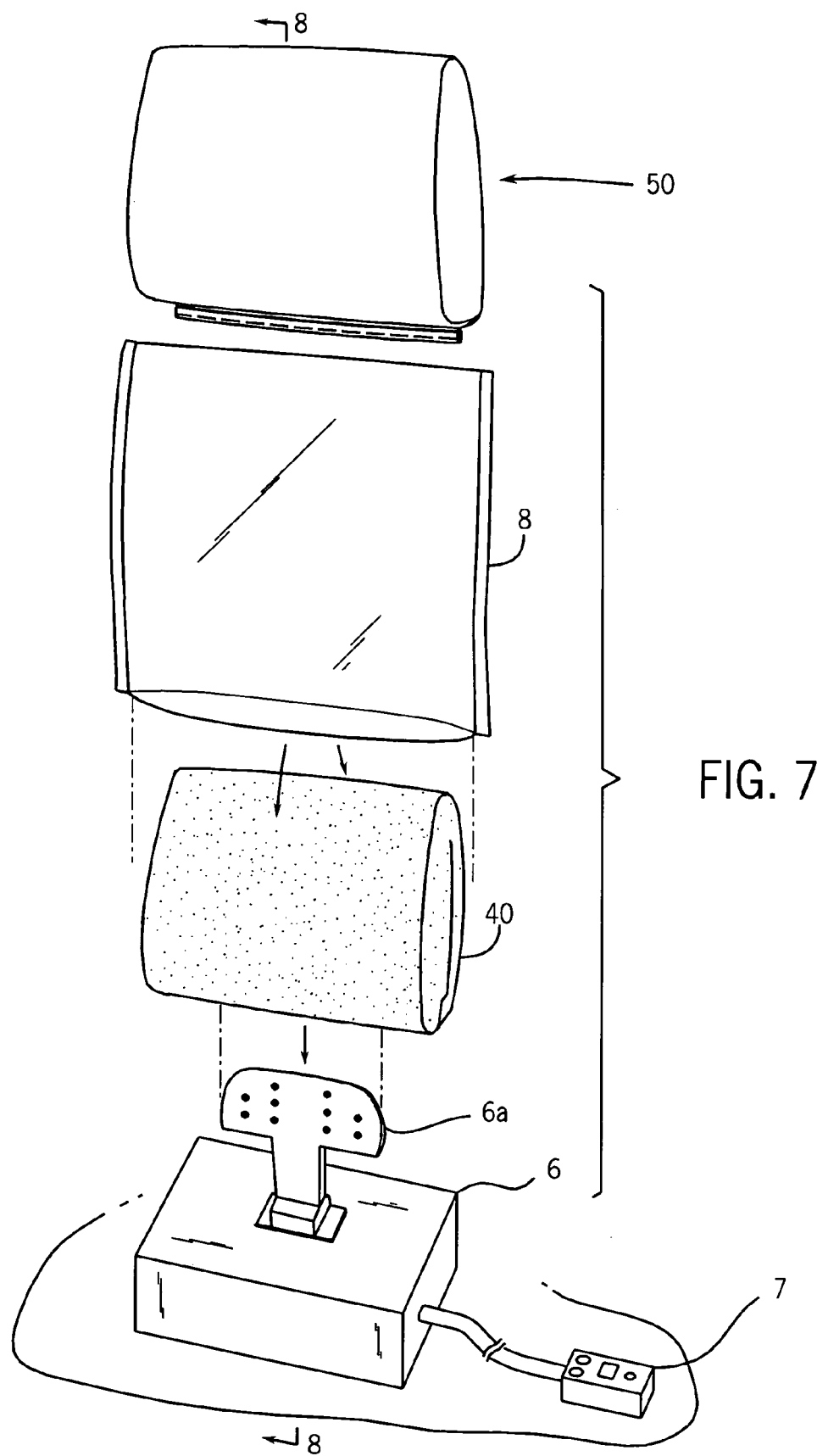

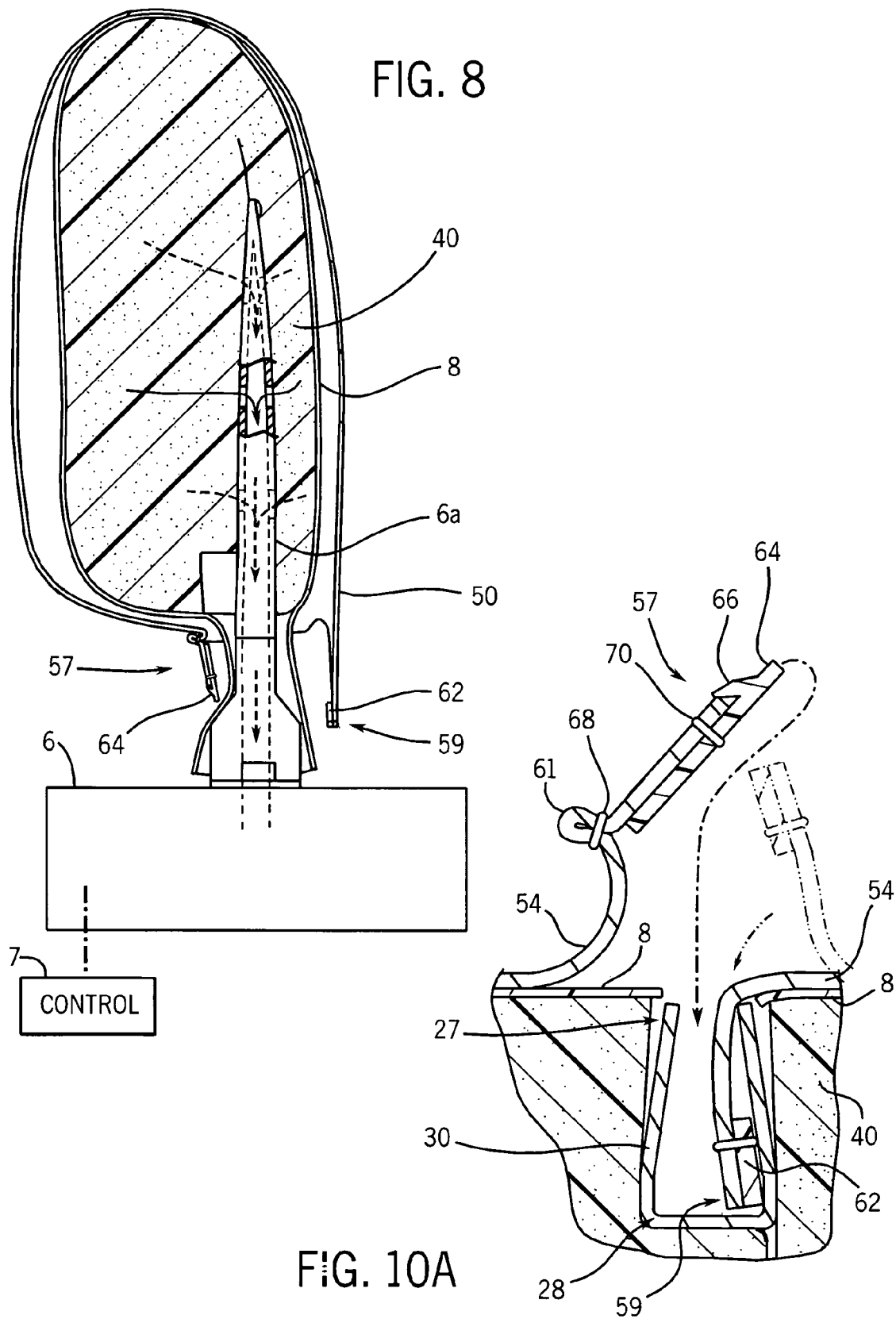

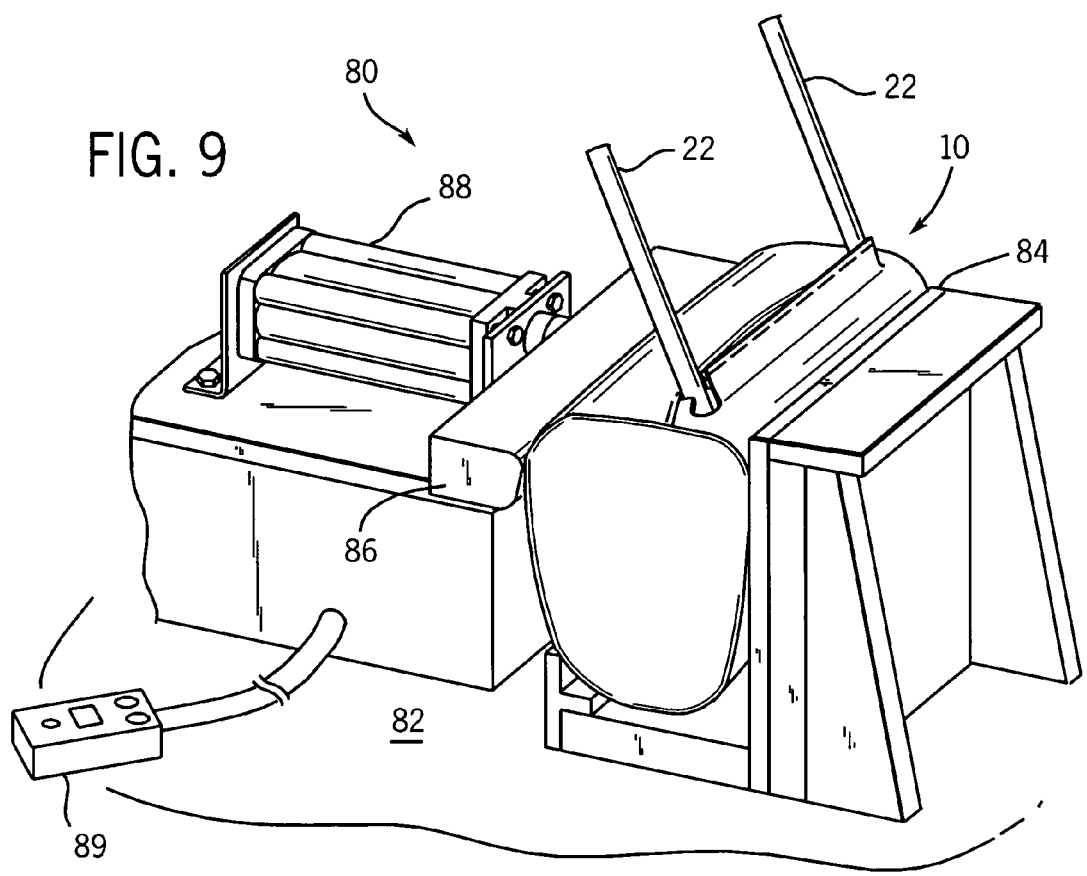
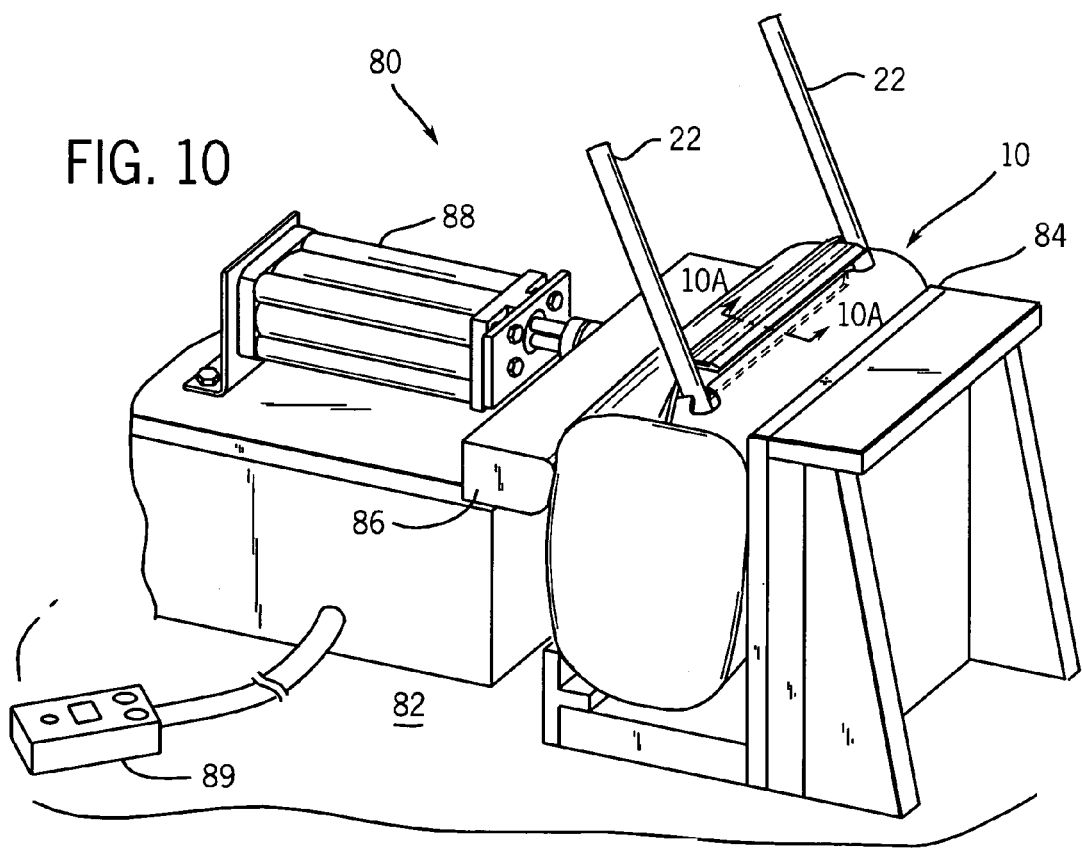

METHOD FOR MAKING A HEAD RESTRAINT ASSEMBLY

CROSS-REFERENCE TO RELATED PATENT APPLICATIONS

This application is a divisional application of U.S. application Ser. No. 10/225,614, filed Aug. 22, 2002, now U.S. Pat. No. 6,857,699 incorporated herein by reference in its entirety.

BACKGROUND OF THE INVENTION

This invention relates to seating assemblies and more particularly to head restraint assemblies and a method for the manufacture of a head restraint assembly.

Head restraint assemblies, or headrests of various designs and construction are used in vehicles, and particularly in automobiles and trucks for head support. Such headrests typically consist of a metal or plastic body surrounded by suitable padding and a cover supported on a post extending from the motor vehicle seat back. The body provides a framework to support the padding and cover of the headrest assembly. Such headrest may be adjustable with respect to the seat back.

One method of manufacturing of head restraint assemblies is to use what is referred to as a foam-in-place method. The hot material is injected into a covering assembly which includes the lamination of a dense foam of about 3 mm to the inner surface of the covering material by an adhesive layer. As a result of the various material types involved in a foam-in-place headrest, a "soft touch" feel is not achieved. In addition, as the foam-in-place material cools, it tends to shrink which produces a mapping effect which is deemed unacceptable for aesthetic purposes. Further, a foam-in-place process tends to penetrate the back of the covering material particularly if the cover material is leather which creates a hard, crusty feel to the leather, also which is not acceptable for aesthetic reasons. One technique that is used to avoid some of these problems, when the covering material of the head restraint assembly is leather, is to utilize only the best portion of the hide which has the tightest, densest fiber structure, typically the center portion, however, using such material is costly and inefficient.

Previous headrests typically require various fasteners, such as bolts and nuts for attaching the headrest body or pillow to the support rod and require bushings to allow the pivoting of the headrest body or pillow with respect to the support rod. Also, the aesthetic properties of the headrest have to be of a quality that is commensurate with other features of the vehicle such as the seats and interior assemblies. Particularly in high-end motor vehicles, generally referred to as luxury vehicles, any level of wrinkling or grandfathering of the material covering the headrest pillows is not tolerated.

Thus there is a need for a head restraint assembly that uses a closure of the covering assembly that is neat and will not fail in use. There is a further need for a head restraint assembly that can be assembled in a minimal amount of time to keep costs of assembly at a minimum. There is also a need for a method of manufacturing a head restraint assembly that eliminates wrinkling or grandfathering of the covers.

SUMMARY OF THE INVENTION

The present invention provides a method for making a head restraint assembly comprising the steps of providing a pillow and placing the pillow on a vacuum machine. Covering the pillow with a bag and drawing the air from the pillow within the bag with the vacuum machine. Providing a cover assembly having a face plate with a front end and a back end and placing the cover assembly over the pillow. Allowing air into the pillow within the bag and cover assembly wherein the pillow expands into the cover assembly. Then trimming the bag material that extends from the cover assembly. Providing a frame assembly and inserting the frame assembly into the pillow. Then inserting the back end of the face panel of the cover assembly into the frame assembly and inserting the front end of the face panel of the cover assembly into the frame assembly wherein the front end and the back end of the face panel of the cover assembly are coupled together within the frame assembly. Another embodiment includes the steps of sewing a flat strip member to the back end of the face panel of the cover assembly and sewing a barb strip member to the front end of the face panel of the cover assembly. Another embodiment of the method includes the step of forming a flap on the front end of the face panel a spaced distance from the barb strip member.

The present invention further provides a retention apparatus to retain portions of a cover assembly of a head restraint assembly. The head restraint assembly includes a frame assembly, a pillow coupled to the frame assembly and a cover assembly having a front end and a back end. The retention apparatus comprises a flat strip member coupled to the back end of the cover assembly, a barb strip member coupled to the front end of the cover assembly, and, a retention member coupled to the frame assembly. The retention member is configured to receive and retain the flat strip member and the barb strip member. The flat strip member and barb strip member, being attached to the ends of the cover assembly are wedged in the retention member. Another embodiment of the retention apparatus includes a sewn flap on the front end of the cover assembly with the sewn flap configured to conceal the flat strip member and the barb strip member in the retention member.

The present invention further provides a head restraint assembly comprising a frame assembly including a retention member. A pillow coupled to the frame assembly with the pillow configured to allow access to the retention member. A cover assembly having a back end and a front end envelopes and conforms to the shape of the pillow with the cover assembly including a flat strip member coupled to the back end and a barb strip member coupled to the front end of the cover assembly. The flat strip member and the barb strip member couple with each other in the retention member closing the cover assembly over the pillow. Another embodiment includes a bead of adhesive disposed on the frame assembly and configured to contact the pillow to prevent movement of the pillow. Another embodiment includes a flap on the front end of the cover assembly with the flap configured to conceal the flat strip member and the barb strip member in the retention member.

The present invention additionally provides a head restraint assembly comprising a means for supporting which includes a means for retaining. A pillow is coupled to the means for supporting with the pillow configured to allow access to the means for retaining. A means for covering having a back end and a front end enveloping and conforming to the shape of the pillow. The means for covering includes a flat strip member coupled to the back end and a means for engaging coupled to the front end of the means for covering. The flat strip member and the means for engaging couple with each other in the means for retaining closing the means for covering. Another embodiment includes a means for adhering disposed on the means for supporting and configured to contact the pillow to prevent movement of the pillow. Another embodiment includes a means for concealing on the front end of the means for covering with the means for concealing configured to conceal the flat strip member and the means for engaging within the means for retaining.

BRIEF DESCRIPTION OF THE DRAWINGS

FIG. 7 is an exploded, perspective view of the relationship of elements during the assembly of an exemplary embodiment of a head restraint assembly on a vacuum machine.

FIG. 8 is a schematic illustration of an assembly step for a head restraint assembly illustrating the evacuation of air (arrows) from the pillow, bag and cover assembly with the vacuum machine.

FIG. 9 is a perspective view of an exemplary embodiment of a head restraint assembly in a vice jig before insertion of the back end and front end of the face panel of the cover assembly.

FIG. 10 is a perspective view of the head restraint assembly of FIG. 9 with the movable jaw of vice jig comprising the pillow and cover assembly to facilitate the insertion of the back end and front end of the face panel of the cover assembly into the retention member.

FIG. 10A is a partial sectional view of the head restraint assembly of FIG. 10 along the line 10A—10A illustrating insertion of the back end and front end of the face panel of the cover assembly into the retention member of the retention apparatus.

DETAILED DESCRIPTION OF THE EXEMPLARY EMBODIMENTS

Before beginning the detailed description of the exemplary embodiments, several general comments are warranted about the applicability and the scope of the present invention.

The illustrations relate to a seat (also can be referred to as a chair) particularly adapted for motor vehicles, such as automobiles, SUV's, vans, trucks, buses and the like, but the invention is applicable also to seating used in homes, offices, air craft, nautical vehicles or other environments.

Second, the head restraint assembly as illustrated is padded and having certain contours, trim and the like. While this configuration is illustrated as an example, a wide variety of head restraint assembly configurations and appearances will benefit from use of the retention apparatus and method of manufacture described in connection with the illustrated example. Also, the exterior of the head restraint assembly can covered by fabric, polyvinylchloride (vinyl), leather or other materials known and used in the seating art.

Third, with regard to the head restraint assembly described herein, substantial modifications can be made without departing from the invention's intended scope. For example, while certain mechanical systems are described to assemble components to achieve certain results, other mechanisms, manual or powered, can be substituted therefore. For example, a screw rod can be used to move the head restraint relative to the seat. Additional contours can be configured through the use of air bladders or other pneumatic mechanisms. The support assembly can be attached to a seat or it can be attached to other suitable support frameworks within the vehicle in relation to a particular seat. It could also be replaced by other known or subsequently developed support mechanisms.

Figure 1:
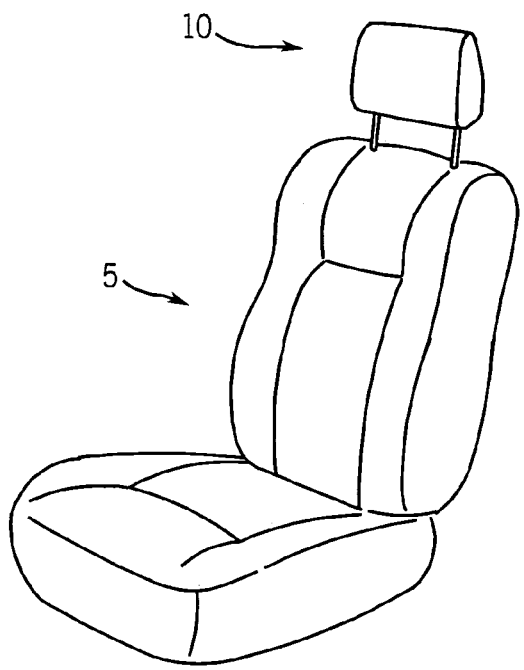
FIG. 1 is a perspective view of an exemplary embodiment of a head restraint assembly coupled to a seat.
Figure 1A:
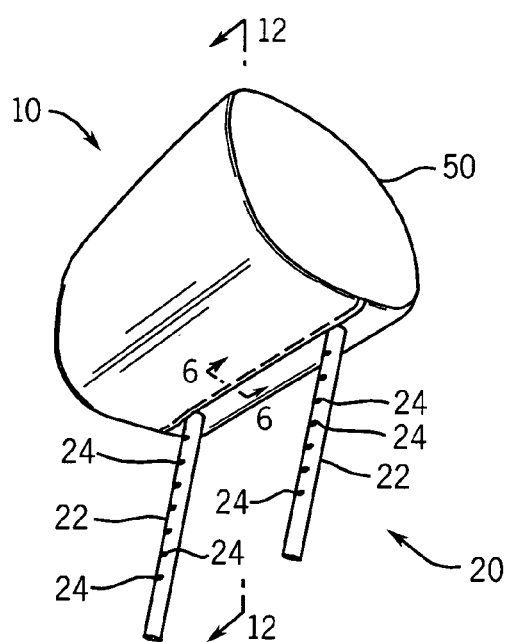
FIG. 1A is a perspective view of an exemplary embodiment of a fully assembled head restraint assembly.

Referring to the Figures, FIG. 1 illustrates a seat 5 with a head restraint assembly 10 coupled to the seat 5. The head restraint assembly 10 comprises a frame assembly 20, a retention apparatus 32, a pillow 40 and a cover assembly 50. FIG. 1A illustrates an exemplary embodiment of a head restraint assembly 10.

Figure 2:
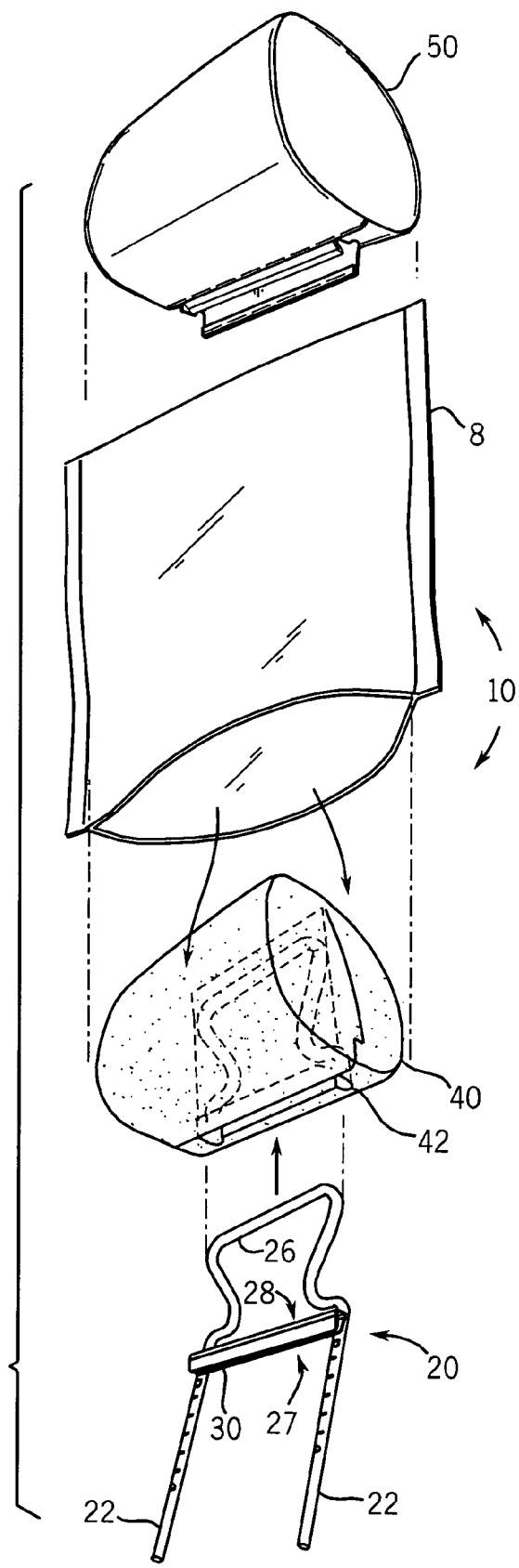
FIG. 2 is an exploded perspective view of an exemplary embodiment of a head restraint assembly illustrating the relationship of several elements of the assembly.

FIG. 2 illustrates an exploded view of the principal parts of an exemplary embodiment of a head restraint assembly 10. The head restraint assembly 10 comprises a frame assembly 20 which includes a pair of vertical support rods 22 and a traverse member 26. The vertical support rods 22 and the traverse member 26 are generally in the shaped of an inverted U. Position notches 24 are located on the vertical support rods 22. The position notches 24 are used to position the headrest assembly 10 in relation to the seat 5. It should be understood that other means of positioning the headrest assembly 10 can be utilized such as for example a friction clamp or a pin and bore. The support rods 22 and traverse member 26 can be formed from a single piece or from separate pieces fastened together by welding or mechanical fasteners.

Figure 6:
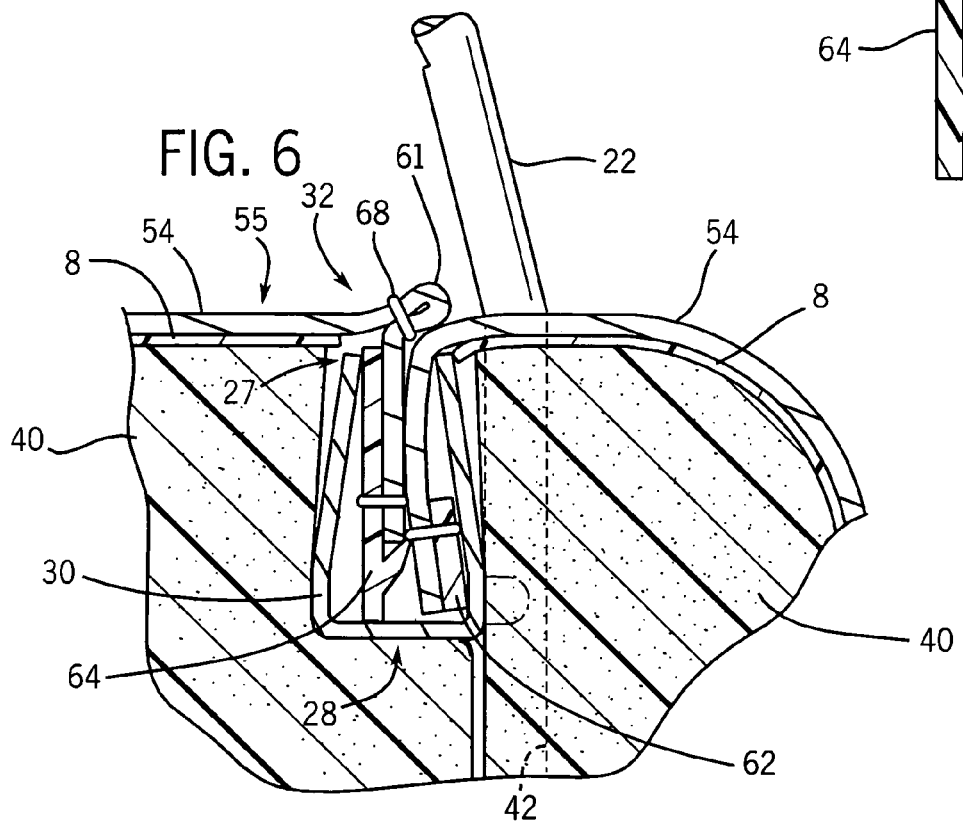
FIG. 6 is a partial, sectional view of the head restraint assembly illustrated in FIG. 1A along the line 6—6 and illustrating the retention apparatus.

A retention member 30 is coupled to the frame assembly 20. The retention member 30 is substantially U-shaped in cross section forming a closed end 28 and an open end 27. The open end 27 of the retention member 30 is positioned away from the traverse member 26 of the frame assembly 20 is illustrated in FIG. 2. A cross section of the retention member is illustrated in FIG. 6. A retention member 30 is a part of a retention apparatus 32 which will be described below. The retention member 30 can be made of any suitable material such as steel or an engineered plastic having sufficient strength and resilience for the purposes described herein. It can be coupled to the frame assembly 20 by welding, adhesives or mechanical fasteners such as screws or nuts and bolts.

A pillow 40 is coupled to the frame assembly 20 and configured to allow access to the retention member 30. The pillow 40 is typically a molded cold cure foam having a formed channel 42. The formed channel 42 is configured and corresponds to the shape of the frame assembly 20 such that the frame assembly 20 nests within the foamed channel 42 of the pillow 40. No mechanical fastening mechanism is necessary to secure the pillow 40 to the frame assembly 20, however a bead of adhesive can be used to prevent movement of the pillow 40 on the frame assembly 20.

Figure 3:
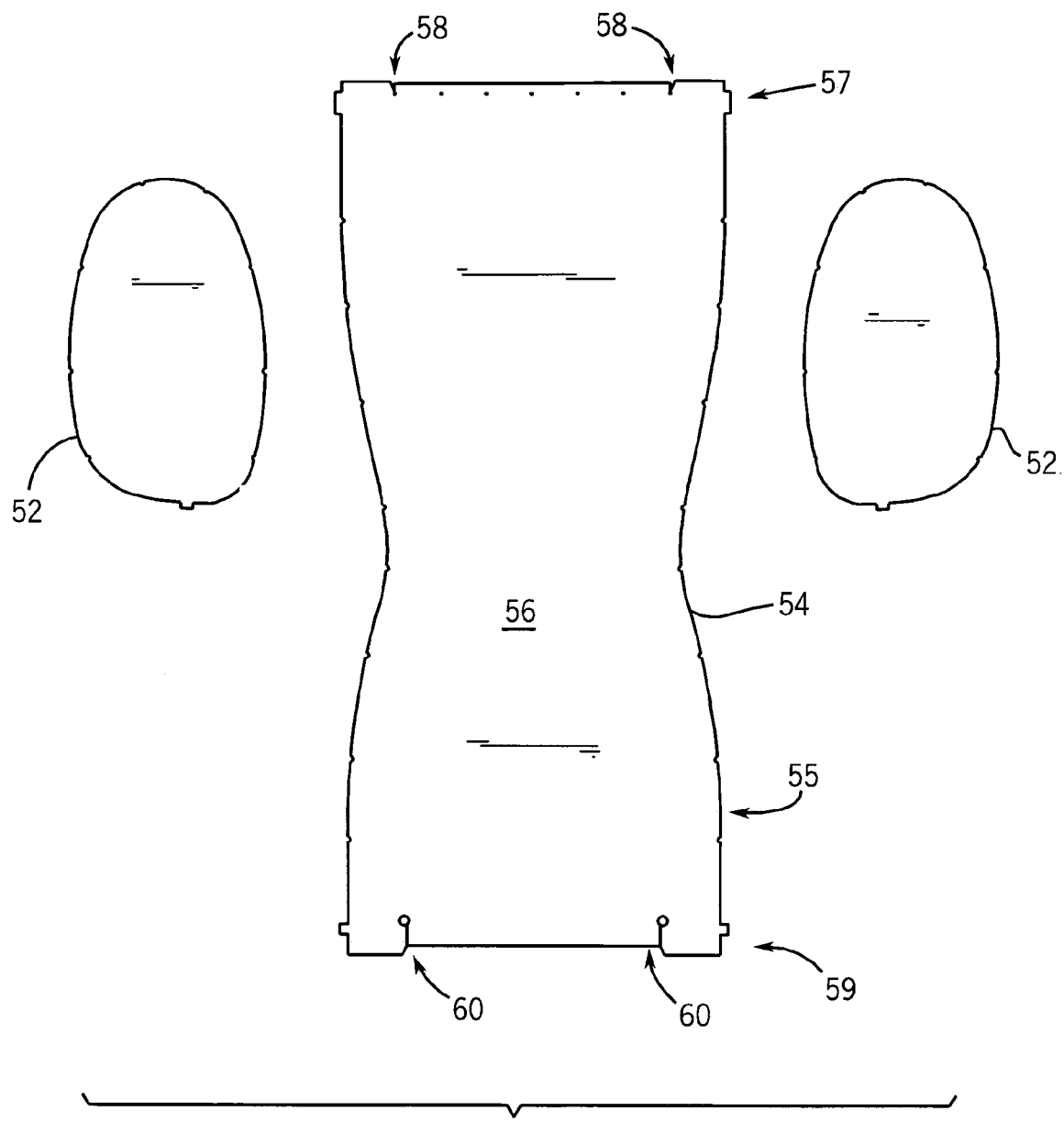
FIG. 3 is a plan overview of exemplary embodiments of components of a cover assembly for a head restraint assembly.

A cover assembly 50 having a back end 59 and a front end 57 is configured to envelope and conform to the shape of the pillow 40. FIG. 3 illustrates an exemplary embodiment of the three components of the cover assembly 50 which includes two side members 52 and a face panel 54. The face panel 54 has a front end 57 and a back end 59. The outer side 55 of the face panel is the side that is seen in the final assembled headrest assembly 10. The inner side 56 is the side of the face panel 54 that faces the pillow 40. The front end 57 of the face panel 54 includes a pair of V-notches 58. The back end 59 of the face panel 54 includes a pair of slits 60. The cover assembly 50 is composed of material 51 selected from a group comprising fabric, polyvinylchloride (vinyl), and leather.

During assembly of the side panel 50 to the face panel 54, the pieces are sewn on the inner side 56 of the material 51. After the side panels 52 are sewn to the face panel 54, the assembly is turned right side out so that the outer side 55 of the face panel 54 is right-side-out. This configuration (sewn lines on the inner side 56 of the material 51) allows fine control and quality of the sewn lines to provide a neat and clean appearance to the final cover assembly 50.

An additional problem that is experienced with a foam-in-place process is that the foam "bleeds" through needle holes along the sewn edges of the cover assembly. To overcome this bleeding, a high density foam pad is adhered to the inner surface of the cover material prior to sewing. This adds extra costs to the assembly. Such problems, particularly the bleed-through effect, are avoided with the methods disclosed herein.

Figure 4:
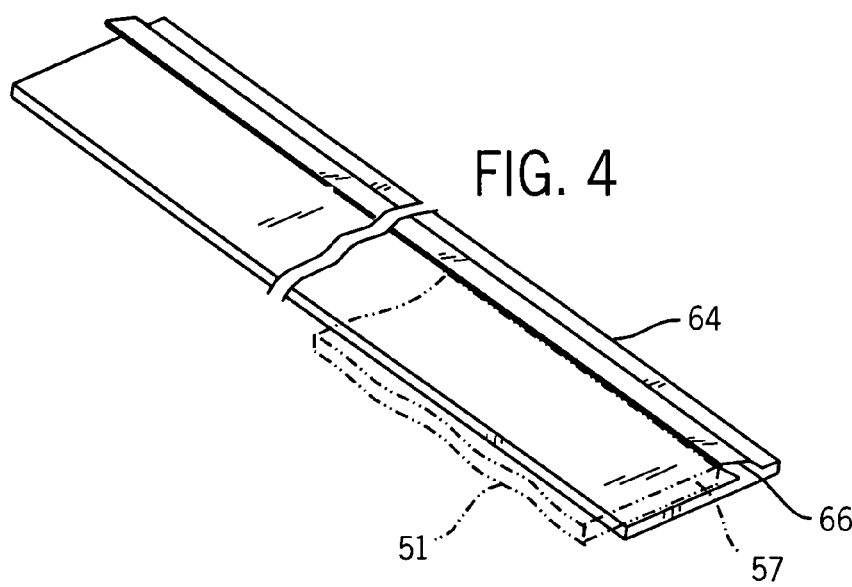
FIG. 4 is a partial perspective view of an exemplary embodiment of a barbed strip and illustrating the placement of the front end of the face panel of a cover assembly against the barb.
Figure 5:
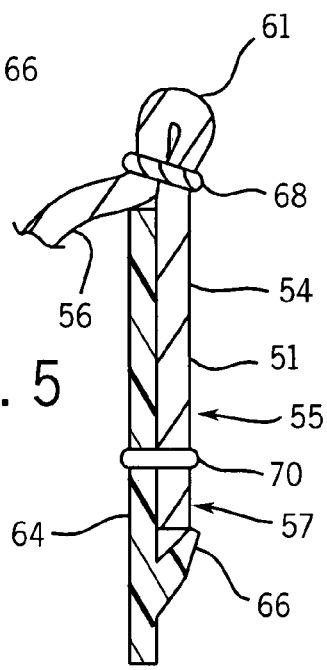
FIG. 5 is a partial sectional detail view of a coupling of the front end of the face panel of a cover assembly with a barb strip and a formal flap.

The cover assembly 50 includes a flat strip member 62 coupled to the back end 59 of the face panel 54. A barb strip member 64 is coupled to the front end 57 of the face panel 54. See FIGS. 4–6. The flat strip 62 as shown in FIG. 6 is sewn to the back end 59 of the face panel 54 between the two slits 60.

A flap 61 is formed in the front end 57 of the face panel 54 by folding the edge of the front end 57 over on itself and sewing a first stitch line 68 substantially along the front end 57 of the face panel 54 and at least between the two notches 58. The sewn flap 61 is positioned from the barb strip member a spaced distance of between 11 mm and 16 mm. The front end 57 of the face panel 54 is then aligned with the barbed strip 64 with the material 51 of the face panel 54 against the barb 66. See FIGS. 4 and 5. A second stitch line 70 couples the front end 57 of the face panel 54 to the barb strip 64. See FIG. 5. It is contemplated that alternative methods of attaching the two strip members 60, 64 to the face panel 54 can be used, such as a suitable adhesive or mechanical fastener, e.g. rivets.

The method for making a head restraint assembly 10 comprises the steps of providing the pillow 40 and placing the pillow on a vacuum machine 6 as shown in FIG. 7. The vacuum machine 6 includes a vacuum head 6A which is configured to receive the pillow 40. The vacuum machine 6 is controlled by a conventional control 7 to draw air out of the pillow 40 and to allow air to return to the pillow 40 as will be described below.

After the pillow 40 is placed on the vacuum head 6A a bag 8 is placed over the pillow 40. The bag 8 can be of any suitable material such as polyethylene or polyvinylchloride or polypropylene or the like. The vacuum machine 6 then draws the air out of the pillow 40 which reduces the size of the foam pillow 40. (See FIG. 8 which illustrates air flow (arrows) moving through the pillow 40 and the vacuum head 6A of the vacuum machine 6.) The cover assembly 50 is then placed over the air reduced pillow 40. The control 7 of the vacuum machine 6 is then manipulated to allow air back into the pillow allowing the pillow to expand into the cover assembly 50. The portion of the bag 8 that extends outside the cover 50 is then trimmed so that a portion of the bag 8 is completely retained within the confines of the cover assembly 50. The pillow 40 and the bag 8 is then removed from the vacuum machine 6. The frame assembly 20 is then inserted into the pillow so that the frame assembly 20 nests within the formed channel 42 of the pillow 40 with the retention member 30 being accessible but retained completely within the cover assembly 50. A bead of adhesive can be applied to the frame assembly 20 and cold cure foam of the pillow 40 to prevent movement between the structures.

To complete the assembly, the back end 59 of the face panel 54 of the cover assembly 50 is inserted into the frame assembly 20 and specifically into the open end 27 of the retention member 30. The front end 57 of the face panel 54 is also inserted into the frame assembly 20 through the open end 27 of the retention member 30. Both the back end 59 and the front end 57 of the face panel 54 with the flat strip 62 and barb strip 64, respectively, are retained within the retention member 30, thereby forming a retention apparatus 32. With the two ends 57 and 59 of the face panel 54 of the cover assembly 50 in the retention member 30, the barb 66 pushes against the back end 59 with the flat strip 62 creating a combined buck that is larger than the open end 27 of the retention member 30. The flap 61 is positioned over the open end 27 of the retention member 30 closing the cover assembly 50. See FIGS. 6 and 10A. A tension force on both the front end 57 and the back end 59 of the face panel 54 is in a direction away from the retention member 30. This tension force tends to pull the ends 57, 59 and push the flat strip 62 and the barb strip 67 together to maintain the front end 57 and back end 59 of the face panel 54 in the retention member 30.

Referring now to FIGS. 9 and 10, there is illustrated a vice jig 80. The vice jig 80 consists of a base 82, a fixed jaw 84 and a movable jaw 86. An actuator 88 is coupled to the movable jaw 86 and is controlled by a jig control 89. The actuator 88 can be of any convenient and conventional type such as a pneumatic cylinder, hydraulic cylinder or a manual ratchet jack.

During the assembly process, the frame assembly 20, the pillow 40 and the cover assembly 50 are placed in the vice jig 80 as illustrated in FIG. 9. The actuator 88 is activated moving the movable jaw 86 towards the fixed jaw 84 thereby compressing the pillow 40 of the head restraint assembly 10 as illustrated in FIG. 10. Such action, compresses the pillow 40 and provides slack in the cover assembly 50. Such slack in the cover assembly 50 allows the manipulation of the front end 57 and back end 59 of the face panel 54 for insertion into the retention member 30 as described above and illustrated in FIG. 10A. While the pillow 40 is compressed in the vice jig 80, the bead of adhesive 31 can be placed within the retention member 30 as described above. With the front end 57 and back end 59 of the face panel 54 inserted in the retention member 30, as illustrated in FIG. 6, the actuator 88 of the vice jig 80 is activated to move the movable jaw 86 thereby releasing the head restraint assembly 10 from the vice jig 80. Such action, allows the pillow

40 to decompress which allows the face panel 54 ends tighten and provide the tension force as described above.

Figure 12:
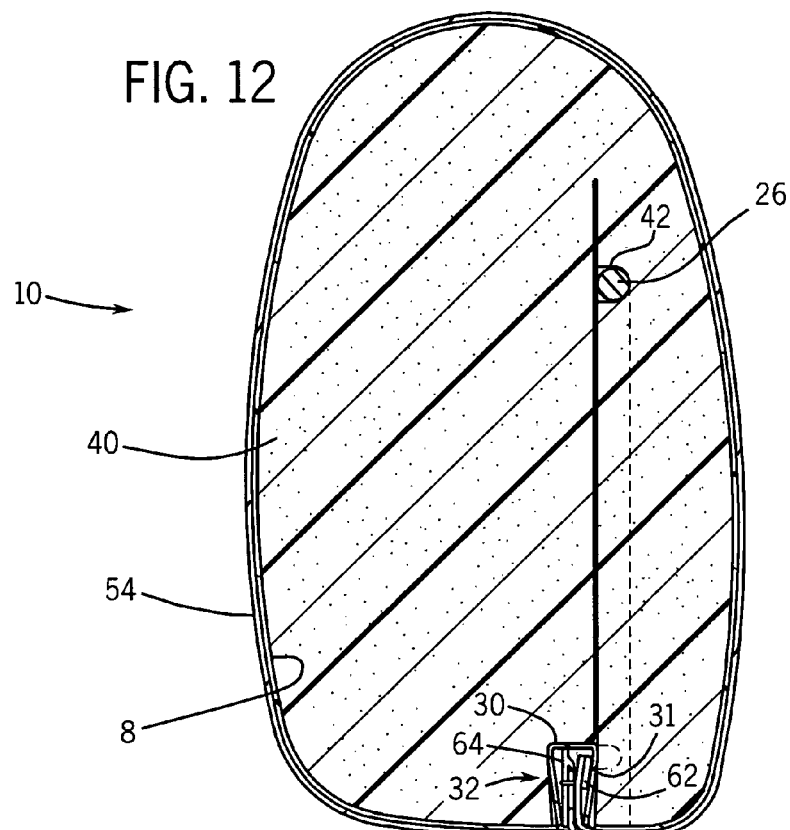
FIG. 12 is a sectional view of the head restraint assembly of FIG. 1A along the line 12—12.
Figure 11:
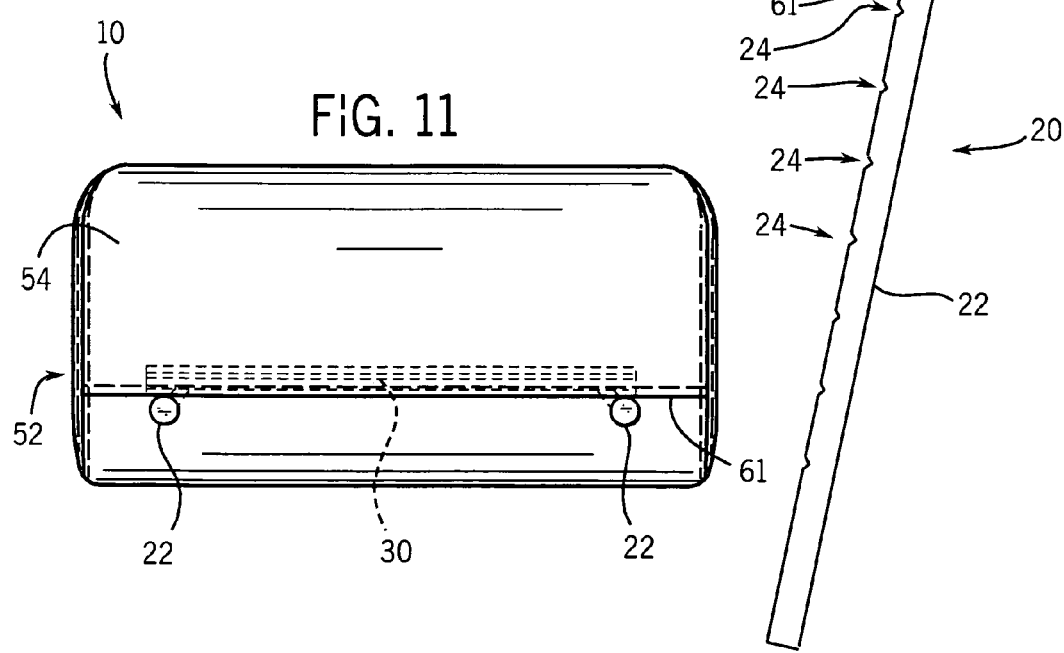
FIG. 11 is a plan view of an exemplary embodiment of an assembled head restraint assembly depicting the concealment of the flat strip member and back strip member in the retention member by the sewn flap on the face panel of the cover assembly.

FIGS. 11 and 12 illustrate an exemplary embodiment of a head restraint assembly 10 in its final assembled form. FIG. 11 specifically illustrates the concealment of the flat strip member 62 and the barb strip member 64 in the retention member 30 by the sewn flap 61 on the face panel 54 of the cover assembly 50. FIG. 12 illustrates the cross section of the head restraint assembly 10 along the lines 12—12 in FIG. 1A and illustrates the relationship of the various parts described above.

Thus there has been disclosed a head restraint assembly and method for its manufacturing. While the embodiments illustrated in the Figures and described above are presently preferred, it should be understood that these embodiments are offered by way of example only. The invention is not intended to be limited to any particular embodiment, but is intended to extend to various modifications that nevertheless fall within the scope of the appended claims. For example, it is also contemplated that remote control actuators can be coupled to the vertical support rods for movement of the head restraint assembly in relation to the seat. It is also contemplated that the pillow can be composed of material other than a cold mold foam provided the materials provides a "soft touch feel" to the pillow and does not penetrate through the cover assembly material or bleed through the sewn lines of the cover assembly. Additional modifications will be evident to those with ordinary skill in the art.

What is claimed is:

1. A method for making a head restraint assembly comprising the steps of:
    providing a pillow;
    placing the pillow on a vacuum machine;
    covering the pillow with a bag;
    drawing the air from the pillow within the bag with the vacuum machine;
    providing a cover assembly having a face panel with a front end and a back end;
    placing the cover assembly over the pillow;
    allowing air into the pillow within the bag and cover assembly wherein the pillow expands into the cover assembly;
    trimming the bag;
    providing a frame assembly;
    inserting the frame assembly into the pillow;
    inserting the back end of the face panel of the cover assembly into the frame assembly; and,
    inserting the front end of the face panel of the cover assembly into the frame assembly and coupling the front end to the back end of the face panel of the cover assembly within the frame assembly.

2. The method for making a head restraint assembly of claim 1, including the steps of:
    sewing a flat strip member to the back end of the face panel of the cover assembly; and,
    sewing a barb strip member to the front end of the face panel of the cover assembly.

3. The method for making a head restraint assembly of claim 1, including the step of forming a flap on the front end of the face panel a spaced distance from the barb strip member.

4. The method for making a head restraint assembly of claim 3, wherein the spaced distance is between 11 mm. and 16 mm.

5. The method for making a head restraint assembly of claim 1, including the steps of:
    placing the head restraint assembly in a vice jig after inserting the frame assembly into the pillow;
    compressing the head restraint assembly with the vice jig; and,
    releasing the head restraint assembly from the vice jig after the step of inserting the front end of the face panel into the frame assembly.

6. The method for making a head restraint assembly of claim 5, including the step of applying adhesive to the frame assembly and pillow to prevent movement.

7. The method for making a head restraint assembly of claim 1, wherein the cover assembly is composed of a material selected from a group comprising fabric, polyvinylchloride, and leather.

* * * * *